(12) United States Patent
Elsner

(10) Patent No.: US 7,364,037 B2
(45) Date of Patent: Apr. 29, 2008

(54) LANE DIVIDER ATTACHMENT FOR MODULAR BELTS

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 41 days.

(21) Appl. No.: 11/383,248

(22) Filed: May 15, 2006

(65) Prior Publication Data

US 2007/0261943 A1 Nov. 15, 2007

(51) Int. Cl.
*B65G 17/38* (2006.01)
(52) U.S. Cl. ........................ 198/853; 198/851
(58) Field of Classification Search .......... 198/850, 198/851, 852, 853
See application file for complete search history.

(56) References Cited

U.S. PATENT DOCUMENTS

| | | | |
|---|---|---|---|
| 1,669,474 A | 5/1928 | La France | |
| 3,554,353 A | 1/1971 | Raudat | |
| 4,473,151 A | 9/1984 | Kumferman | |
| 4,821,872 A * | 4/1989 | Lapeyre | 198/853 |
| 5,101,966 A | 4/1992 | Lapeyre | |
| 5,137,144 A * | 8/1992 | Uehara | 198/851 |
| 5,911,303 A * | 6/1999 | Malanowski | 198/731 |
| 6,079,543 A | 6/2000 | Palmaer | |
| 6,216,854 B1 | 4/2001 | Damkjær et al. | |
| 6,766,901 B2 | 7/2004 | Guldenfels et al. | |
| 6,811,021 B1 * | 11/2004 | Corley | 198/853 |
| 6,837,365 B1 | 1/2005 | Forbin | |
| 2004/0238329 A1 | 12/2004 | Verdigets et al. | |
| 2007/0034486 A1 * | 2/2007 | Montemartini et al. | 198/853 |

* cited by examiner

*Primary Examiner*—James R. Bidwell
(74) *Attorney, Agent, or Firm*—Hodgson Russ LLP

(57) ABSTRACT

A lane divider attachment with a flight portion that extends above the top surface of the belt module and provides a barrier to stop goods from shifting away from their position. The lane divider attachment includes a transverse pivot rod opening or recess disposed in alignment with the pivot rod openings in the module when the lane divider is installed. A hook portion that snaps over the crossbar (cross rib) portion of the module may be included to secure the lane divider attachment to the crossbar.

16 Claims, 13 Drawing Sheets

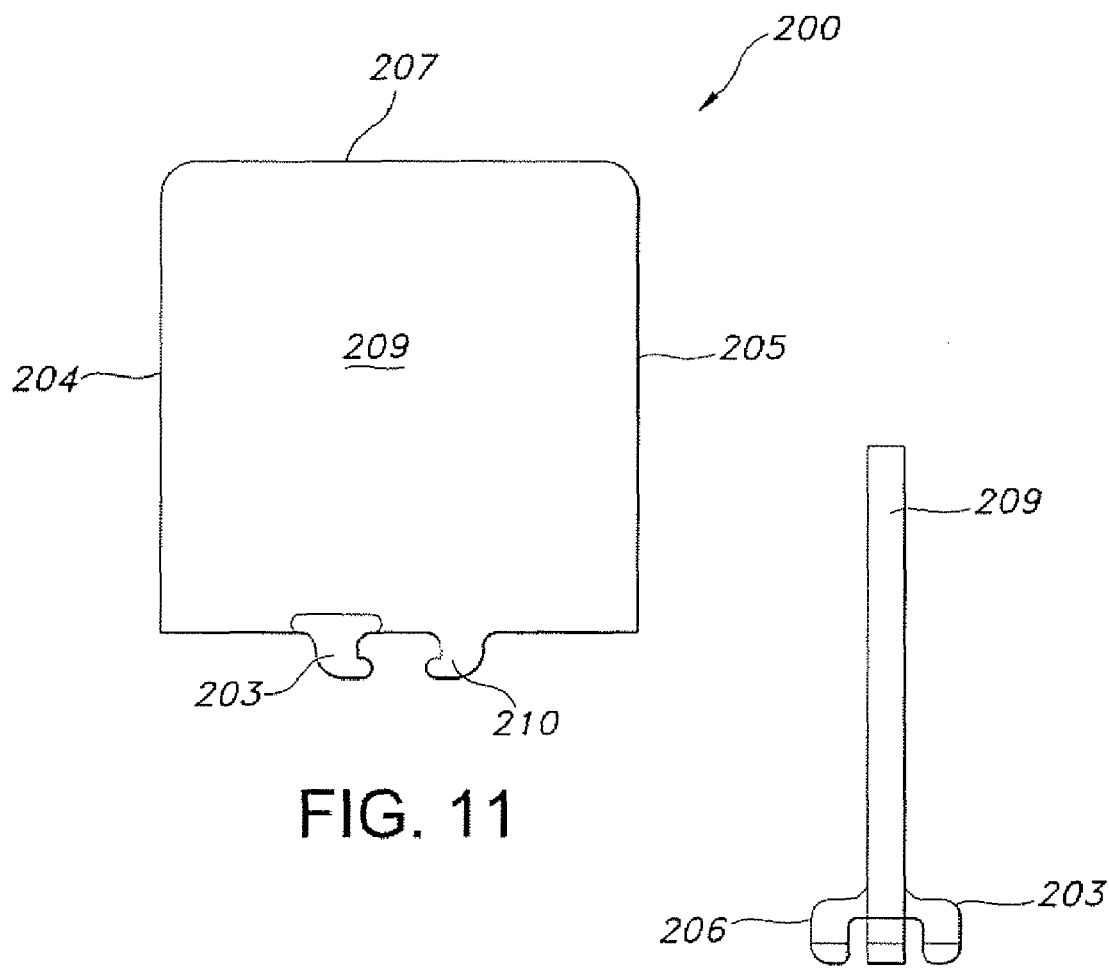
FIG. 11
FIG. 12
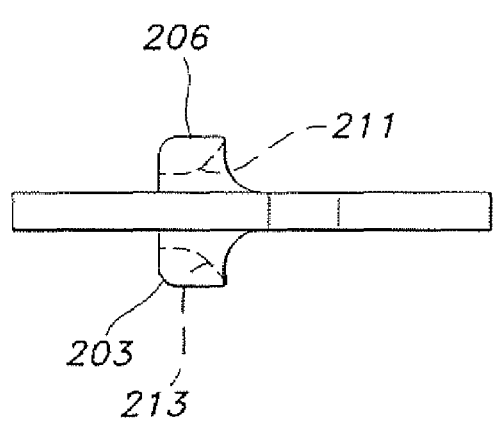
FIG. 13

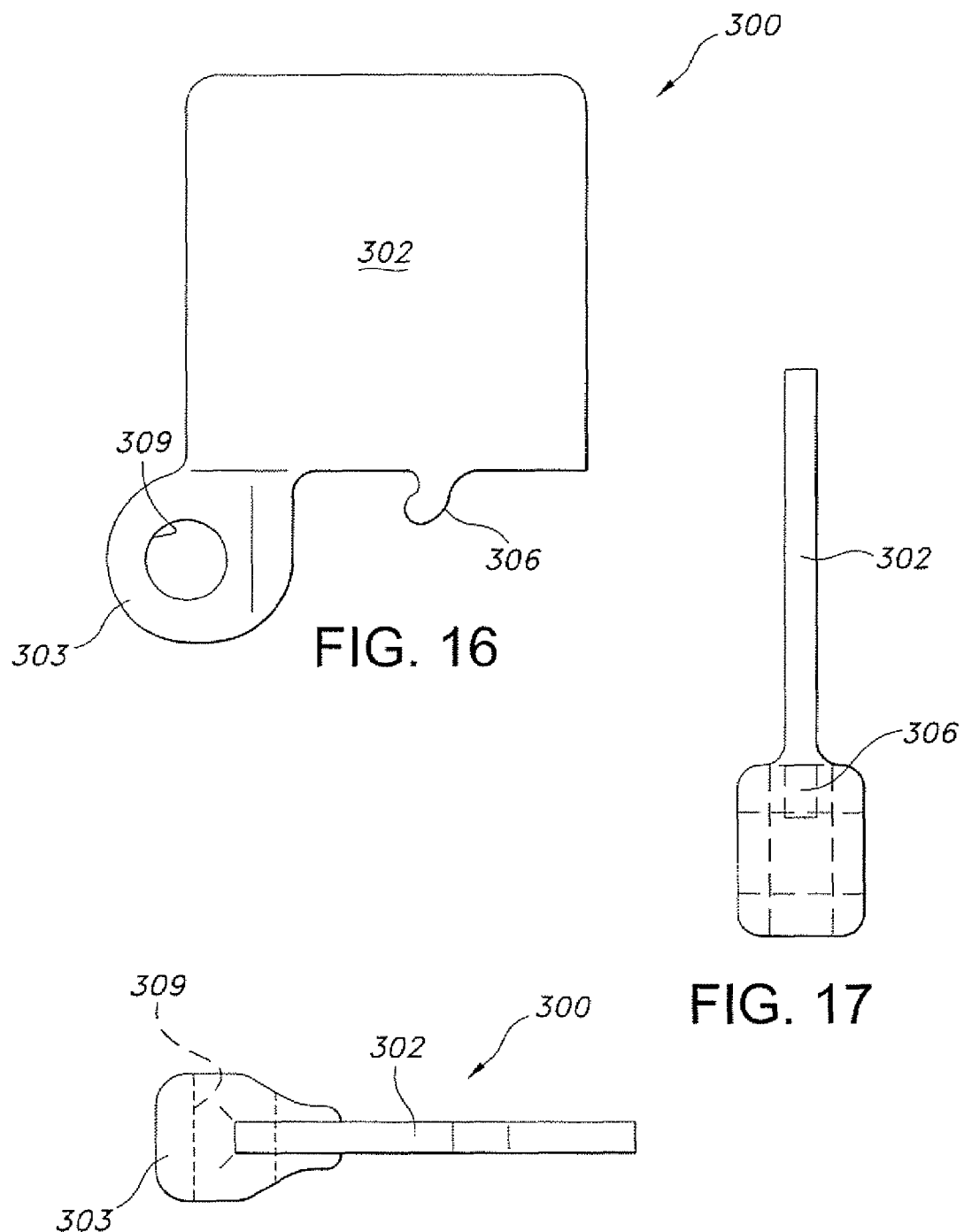

LANE DIVIDER ATTACHMENT FOR MODULAR BELTS

FIELD OF THE INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side-by-side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

Modular belts are often used to transport goods that should stay in place on the belt during transport. The goods should not shift when the belt is moving upwards, downwards, or around a curve. When the belt moves around a curve, there is a risk of the goods shifting sideways due to centrifugal forces.

Sometimes goods are transported in trays made of metal or plastic. This usage is typical in bakeries. The coefficient of friction between the trays and the belt is usually very low, which makes shifting of the goods even easier. To avoid shifting of the goods in the incline, various solutions have been offered, mainly solid molded flights extending above the top surface of the module.

For preventing goods from shifting sideways over the belt edge, side guards have been used such as those disclosed in U.S. Pat. No. 6,766,901, which is incorporated herein by reference. The patent discloses a side guard that is snapped into the module. Other side guards inserted in the belt along its edges may be secured by pivot rods that extend through openings (eyelets) of the plates.

In specific applications, where the goods need to be transported in two or more parallel lengthwise rows, lane dividers are needed to divide the belt surface into two or more lanes separated by platelike attachments. The lane dividers are needed particularly for radius belts, where the centrifugal forces may help to move the goods on the belt.

Lane dividers for radius belts are typically of the snap-on type. Since there is very little room on the links for the snap-on function to avoid hindering the collapsing, it is difficult to make the divider secure enough.

There is a need for a simple device that can inexpensively and flexibly be installed in various places on modular belts. Particularly there is a need for such devices which can be installed on a modular belt without hindering the collapsing of the belt rows when moving through a curve but providing a secure attachment without the risk of the divider falling off.

SUMMARY OF THE INVENTION

In some of the embodiments, the present invention meets the above described need by providing a lane divider having a flight portion, an eyelet portion, and a hook portion. The flight portion extends above the top surface of the module and provides a barrier to stop the goods from shifting away from their position.

The eyelet portion fits into a space created by removing at least a portion of the belt module. The eyelet portion includes a transverse pivot rod opening disposed in alignment with the pivot rod openings in the module when the lane divider is installed.

The hook portion is disposed in spaced apart relation to the eyelet portion. The hook portion snaps over the crossbar (cross rib) portion of the module such that the cross rib is disposed between the hook portion and the eyelet portion.

In alternate embodiments, the lane divider may be attached to the module without an eyelet portion or without a hook portion.

BRIEF DESCRIPTION OF THE DRAWINGS

FIG. 11 is a side elevational view of a third embodiment of the lane divider of the present invention;

FIG. 12 is a end elevational view of the lane divider of FIG. 11;

FIG. 13 is a top plan view of the lane divider of FIG. 11;

FIG. 16 is a side elevation view of a fourth embodiment of the lane divider of the present invention;

FIG. 17 is an end elevational view of the lane divider of FIG. 16;

FIG. 18 is a top plan view of the lane divider of FIG. 16;

DETAILED DESCRIPTION OF THE INVENTION

Figure 1:
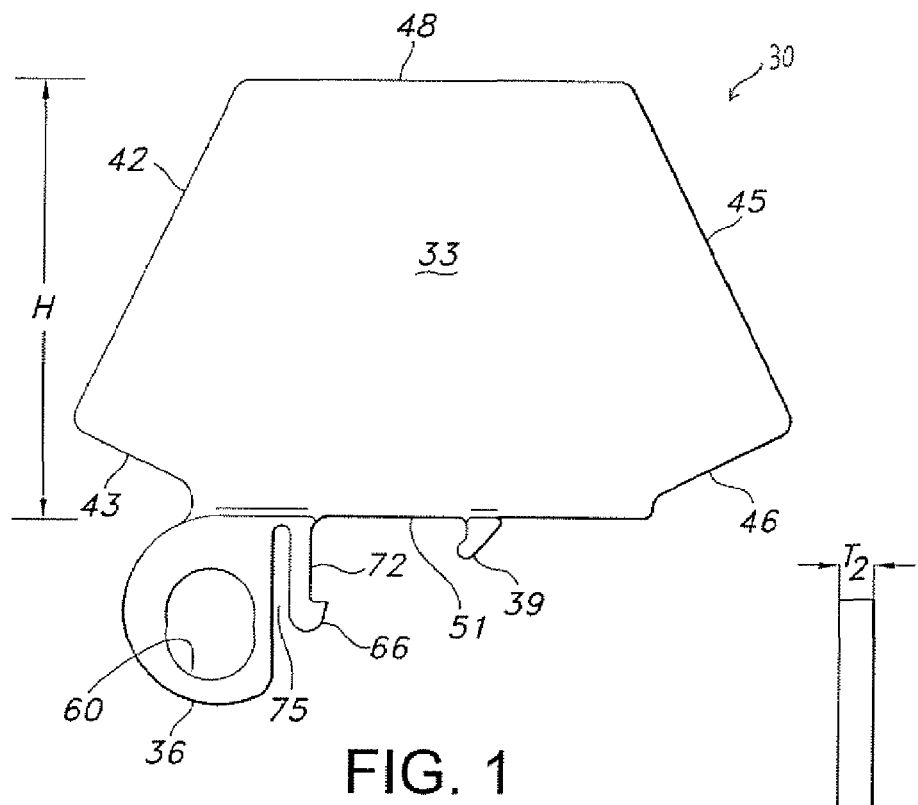
FIG. 1 is a side elevational view of a first embodiment of the lane divider of the present invention.

Referring to FIG. 1, lane divider 30 has an upstanding flight portion 33, an eyelet portion 36, and a hook portion 39. The upstanding flight portion 33 may be provided with a height H of approximately 20-30 mm. In most cases this range is sufficient because the lane divider only has to be tall enough to stop the goods from shifting away from their position. Other sizes may also be suitable depending on the size of the belt or the goods.

The flight portion 33 has at least two side walls 42, 45 extending to a top wall 48. The side walls 42, 45 may be disposed at approximately equal and opposite angles from the top wall 48 as shown. Additional walls 43 and 46 connect to a bottom wall 51. Other shapes for the flight portion may also be suitable. The eyelet portion 36 and the hook portion 39 extend from the bottom wall 51 of the flight portion 33. The eyelet portion 36 is provided with a transverse pivot rod opening 60.

Figure 2:
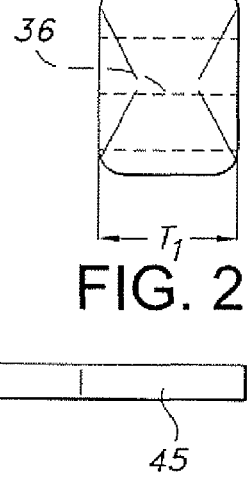
FIG. 2 is an end elevational view of the lane divider of FIG. 1.

Turning to FIG. 2, the eyelet portion 36 has a thickness $T_1$ which is greater than the thickness $T_2$ of flight portion 33. The thickness $T_1$ of the eyelet portion 36 is approximately the thickness of a link end 84 (FIG. 5).

Returning to FIG. 1, hook portion 39 extends downward at an angle from the flight portion 33. Hook portion 39 cooperates with an angled portion 66 disposed adjacent to the eyelet portion 36 and in spaced apart relation to the hook portion 39. When the lane divider 30 is installed in the module 67 as shown in FIG. 5, the cross rib or crossbar 78 of the module 67 is captured between hook portion 39 and angled portion 66 and is bordered by wall portion 72. Accordingly, the hook portion 39 and angled portion 66 cooperate to form a retention member for securing the lane divider attachment to the module.

Figure 3:
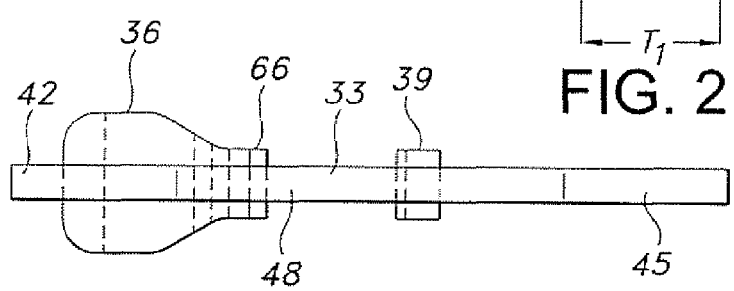
FIG. 3 is a top plan view of the lane divider of FIG. 1.

As shown in FIG. 3, the eyelet portion 36 has the overall shape of a link end. The flight portion 33 extends upward from the eyelet portion 36. An opening 75 (FIG. 1) is disposed between hook portion 39 and the wall portion 72. Angled portion 66 extends laterally from the wall portion 72 as best shown in FIG. 1.

Figure 5:
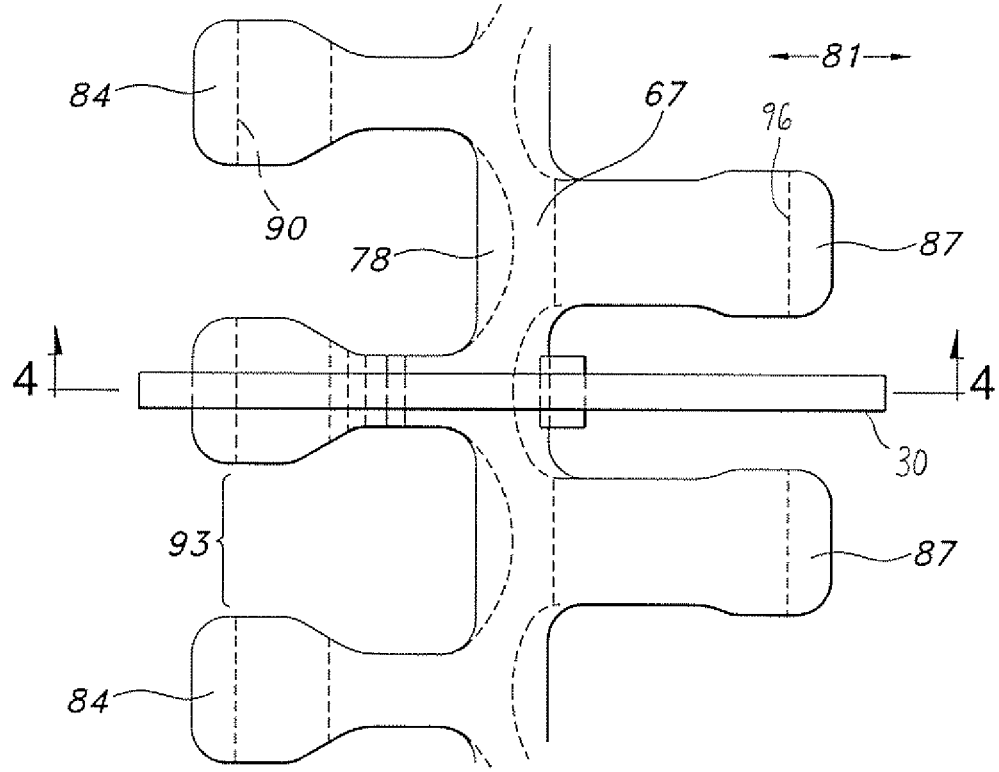
FIG. 5 is a top plan view of a portion of a module with the lane divider of FIG. 1 attached thereto.

Turning to FIG. 5, a portion of module 67 is shown in plan view. A cross rib or cross bar 78 extends transverse to the direction of belt travel indicated by arrow 81. A first plurality of link ends 84 extend to the left with respect to the orientation of FIG. 5. A second plurality of link ends 87 extend from the cross rib 78 in the opposite direction from the first plurality of link ends 84. Link ends 84 have first transverse openings 90 that are aligned in the transverse direction. The first plurality of link ends 84 are disposed in spaced apart relation such that a second plurality of link ends 87 on an adjacent module can be intercalated in the openings 93. Link ends 87 have elongated slots 96 that allow connected belt modules to collapse for negotiating turns as will be evident to those of ordinary skill in the art based on this disclosure.

When the second link ends 87 of an adjacent module (not shown) are intercalated in the openings 93 and the transverse pivot rod openings 90, 96 are aligned, a pivot rod (not shown) can be inserted to pivotally connect adjacent modules 67.

Figure 4:
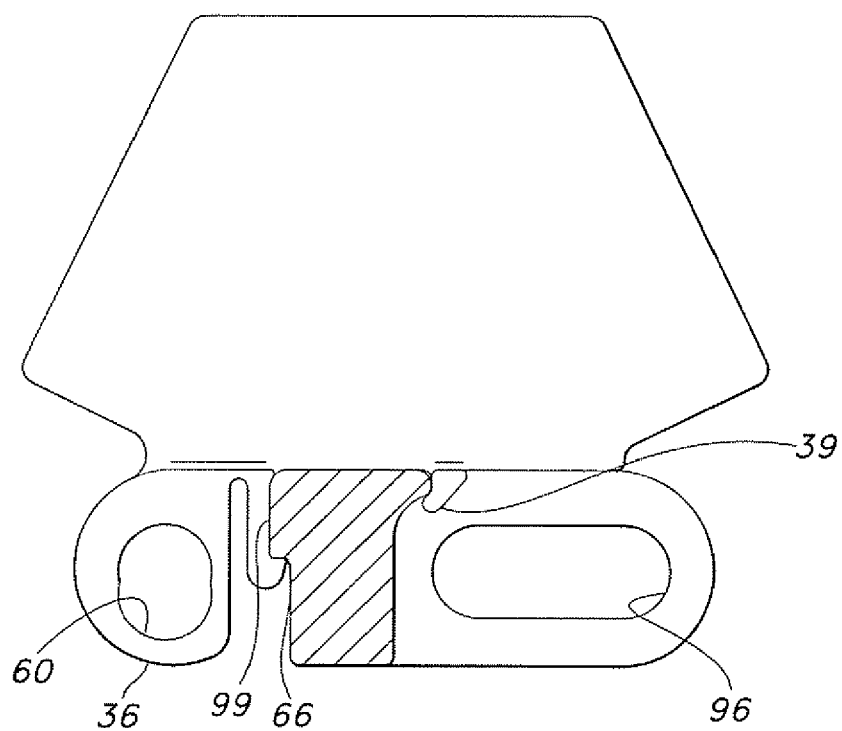
FIG. 4 is a cross-sectional view taken along lines 4-4 of FIG. 5.

In order to provide space for the eyelet portion 36, one of the first link ends 84 is truncated and terminates at end wall 99 (shown in FIG. 4). End wall 99 abuts with wall 72 when the lane divider 30 is attached to the cross rib 78 as shown in FIG. 4. The transverse pivot rod opening 60 in lane divider 30 aligns with the remaining transverse pivot rod openings. Accordingly, the lane divider 30 is fixed securely to the module 67 by the pivot rod (not shown) and by attachment to the cross rib 78.

Figure 6:
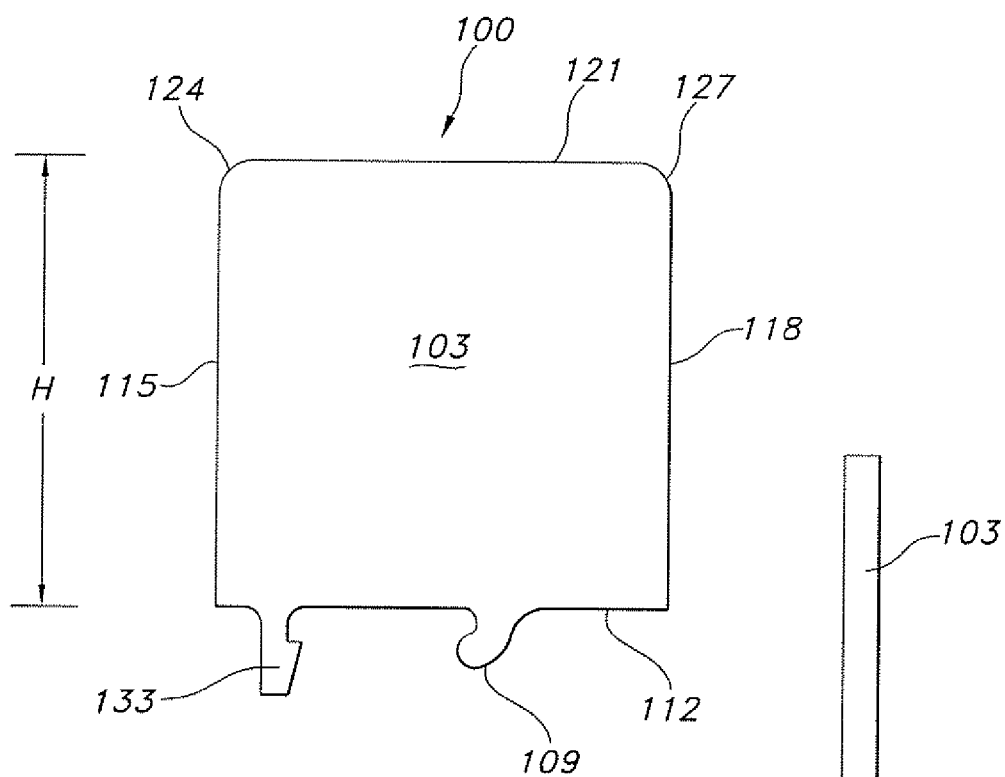
FIG. 6 is a partial side elevational view of a second embodiment of the lane divider of the present invention with the side support structure removed for clarity.

Turning to FIGS. 6-10, an alternate embodiment of the present invention is shown. Lane divider 100 has an upstanding flight portion 103 and a hook portion 109. The upstanding flight portion 103 may be provided with a height H of approximately 20-30 mm as described above to prevent the goods from shifting. The flight portion 103 has a substantially square overall shape when viewed from the side as shown in FIG. 6. The flight portion 103 is solid and does not include any transverse openings. The hook portion 109 extends from a bottom wall 112. Side walls 115, 118 extend to a top wall 121. As shown, the side walls 115, 118 and top wall 121 may be substantially straight. The corners 124, 127 where the side walls 115, 118 and top wall 121 meet may be rounded as shown.

Figure 7:
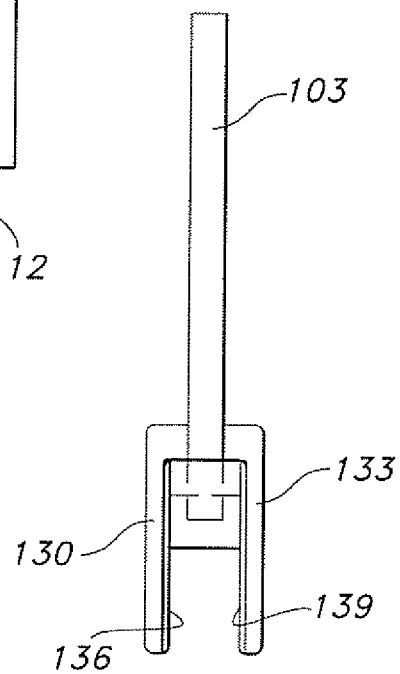
FIG. 7 is an end elevational view of the alternate embodiment of the lane divider.
Figure 8:
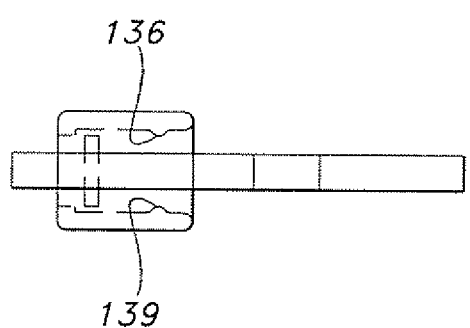
FIG. 8 is a top plan view of the alternate embodiment of the lane divider.

In FIG. 7, a pair of support members 130 and 133 are shown. The support members 130 and 133 extend substantially parallel and in spaced apart relation. The inside surfaces of the support members 130, 133 may be provided with ribs 136, 139 disposed in facing relation (best shown in FIG. 8). The support members 130, 133 extend around a truncated link end 142 (FIG. 10) and the ribs 136, 139 frictionally engage with the side walls 145, 148 of the truncated link end 142.

Figure 9:
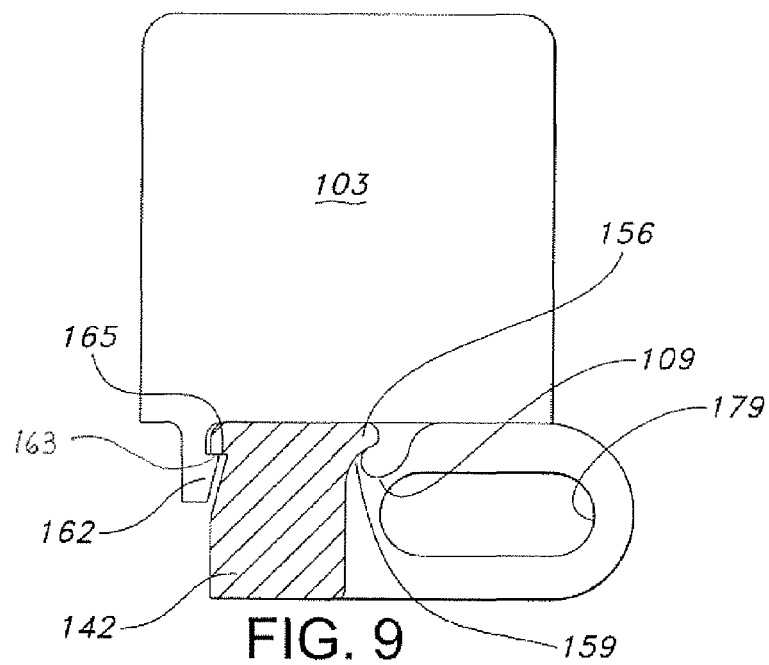
FIG. 9 is a cross-sectional view taken along lines 9-9 of FIG. 10.

Turning to FIG. 9, the engagement of hook portion 109 with the transverse rib 150 of the belt module 153 is shown in detail. The transverse rib 150 has a T-shaped cross section with a wider top section 156 having a shoulder 159 at the rear. The hook portion 109 engages the shoulder 159 at the rear. An angled portion 162 extends downward from the flight portion 103 in spaced apart relation to the hook portion 109. The angled portion 162 has a ledge 163 that engages with a shoulder 165 formed in the truncated link end 142. The angled portion 162 and hook portion 109 are sized such that they frictionally engage or "snap-fit" onto the truncated link end 142 and shoulder 159 of the transverse rib 150. Accordingly, the angled portion 162 and hook portion 109 cooperate to form a retention member for securing the lane divider to the module.

Figure 10:
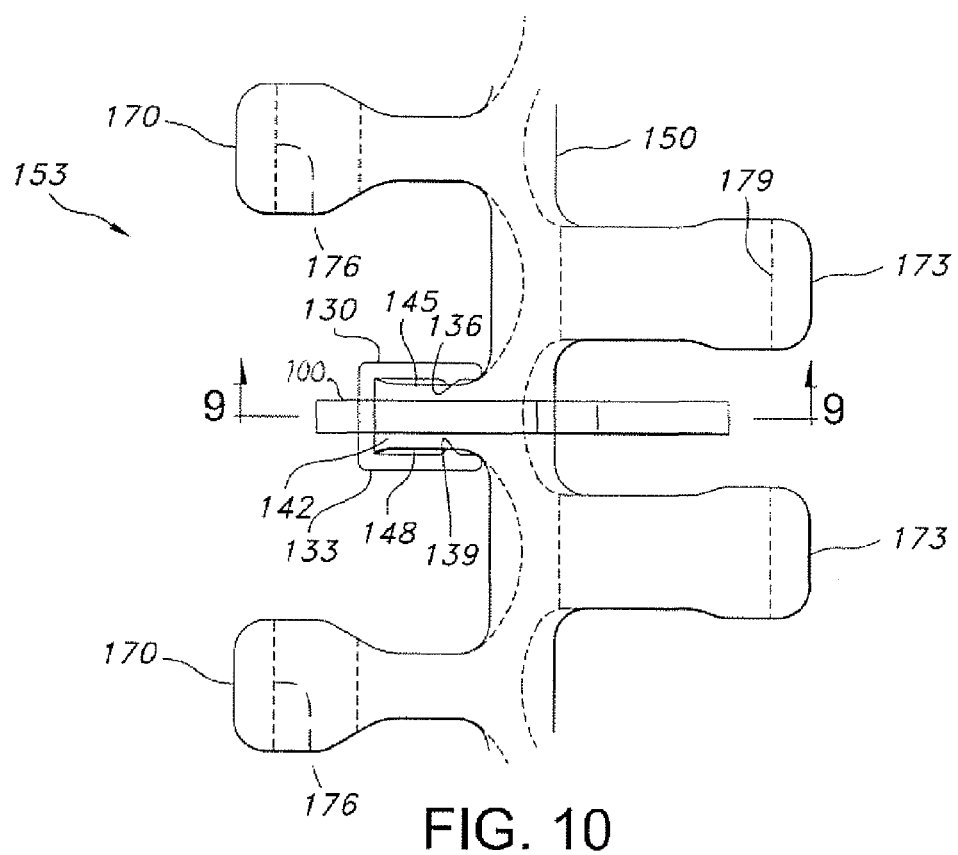
FIG. 10 is a top plan view of a portion of a module with the alternate embodiment of the lane divider attached thereto.

As shown in FIG. 10, the lane divider 100 is held in position by the combination of the ribs 136, 139 inside the support members 130, 133 and the angled and hook portions 162, 109 engaging with the truncated link end 142 and the shoulder 159 on the transverse rib 150. In addition to the truncated link end 142, belt module 153 has conventional link ends 170, 173 extending in opposite directions. Link ends 170 include transverse openings 176. Link ends 173 include elongated transverse slots 179 to form a radius belt as will be evident to those of ordinary skill in the art.

Turning to FIGS. 11-15, a third embodiment of the lane divider is shown. As shown in FIGS. 11-12, lane divider 200 is provided with a pair of support members 203, 206 extending from opposite sides of the flight portion 209. The support members 203, 206 extend from each side of the flight portion 209 and are disposed in spaced apart relation. The support members 203, 206 extend downward with respect to the orientation of the lane divider shown in FIG. 12. A hook portion 210 extends downward from the flight portion 209 as best shown in FIG. 11. The flight portion 209 includes a pair of side walls 204, 205. A top wall 207 extends between the side walls 204, 205.

In FIG. 13, a top view of the support members 203, 206 is shown. The support members have opposed walls 211, 213 that are curved to frictionally engage with the curved edge 216 on the top surface 219 of the module 222 where the link end 225 joins with an intermediate section 228 as shown in FIG. 15.

Figure 14:
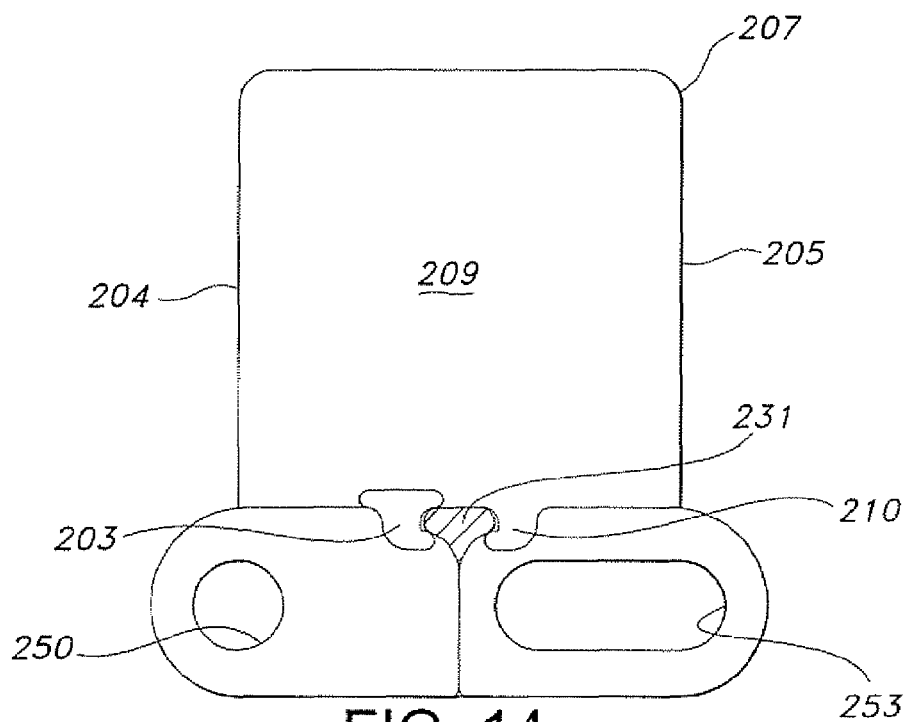
FIG. 14 is a cross-sectional view taken along lines 14-14 of FIG. 15.

Turning to FIG. 14, the support members 203, 206 and the hook portion 210 engage with opposite sides of a transverse rib 231. The support members 203, 206 and the hook portion 210 may frictionally engage or "snap-fit" onto the transverse rib 231. Accordingly, the support members 203, 206 and the hook portion 210 cooperate to form a retention member for securing the lane divider to the module.

Figure 15:
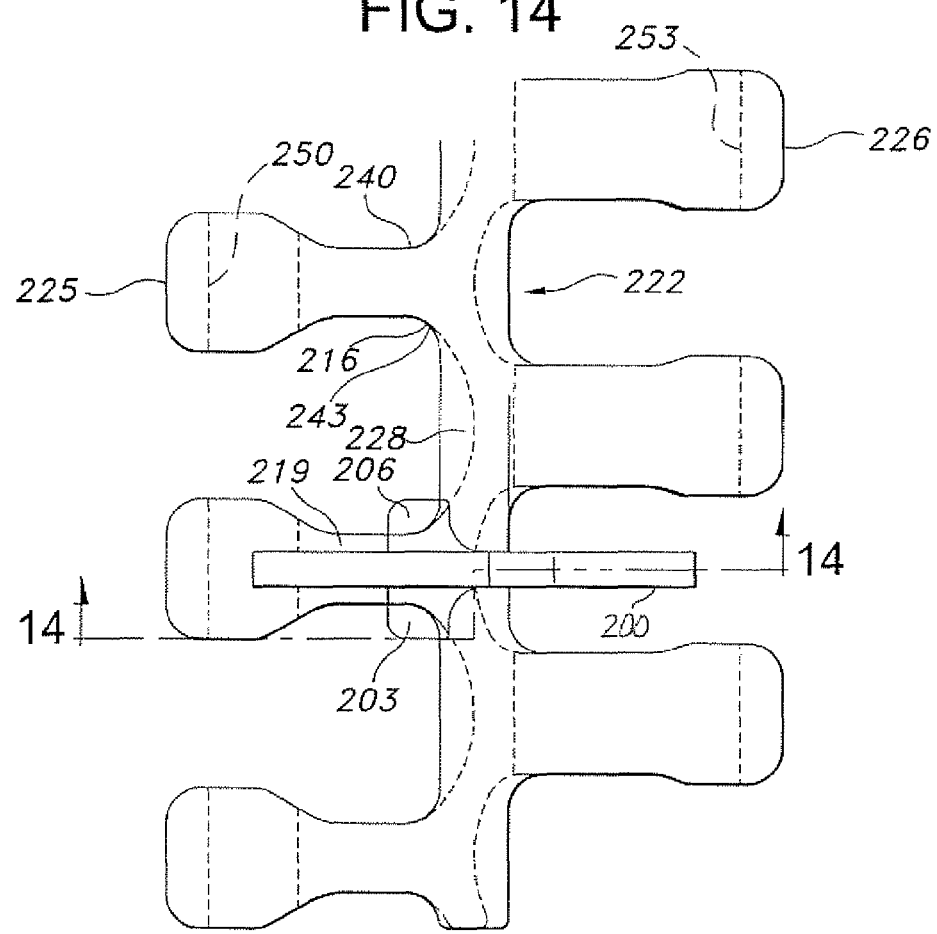
FIG. 15 is a top plan view of a portion of a belt module with the lane divider of FIG. 11 attached thereto.
Figure 19:
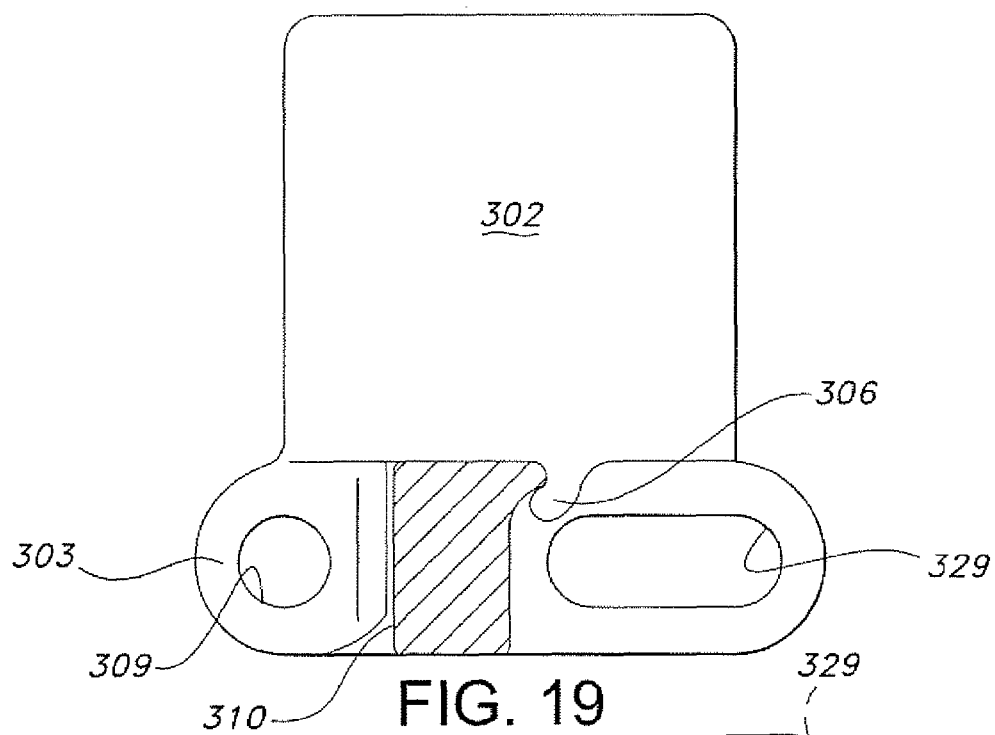
FIG. 19 is a cross-sectional view taken along lines 19-19 of FIG. 20.

As shown in FIG. 15, the lane divider 200 does not require any modification to the link end 225 where it is attached. The lane divider 200 fits over the top surface 219 and engages with the curved walls 240, 243 on opposites sides of the link end 225 and engages with the transverse rib 231 as shown in FIG. 14. The module 222 has link ends 225 extending from intermediate section 228. Link ends 226 extend in the opposite direction from the intermediate section 228. Link ends 225 have transverse pivot rod openings 250. Link ends 226 have elongated transverse slots 253.

Figure 20:
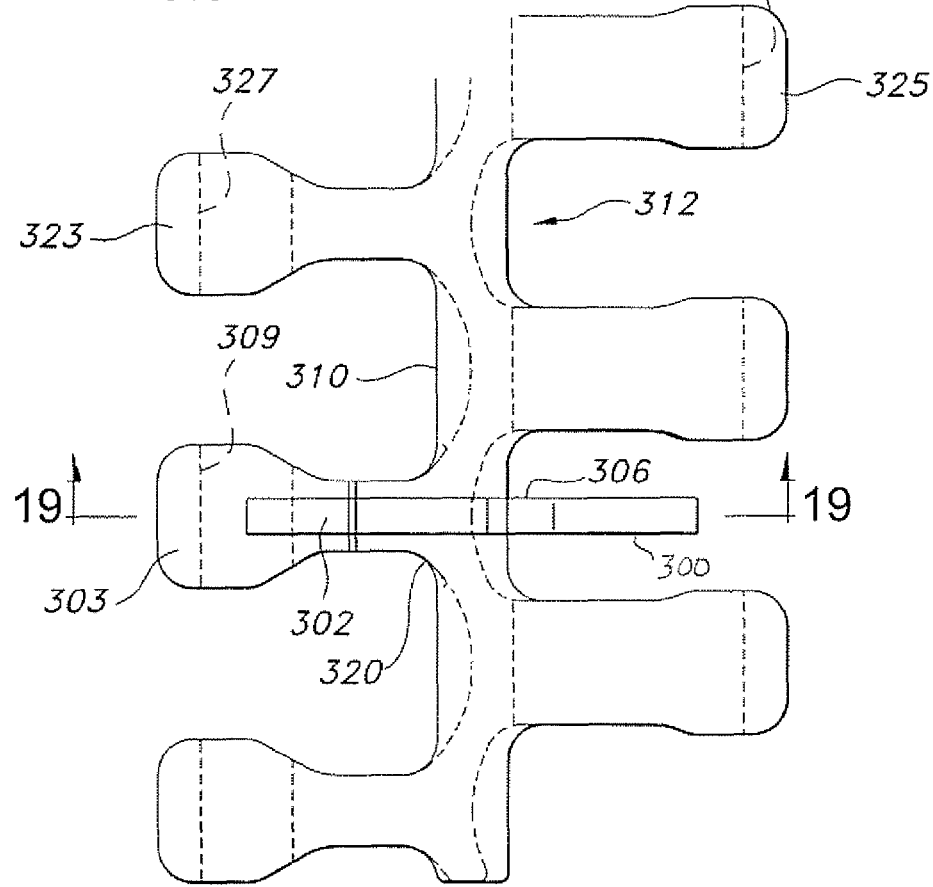
FIG. 20 is a top plan view of a portion of a belt module with the lane divider of FIG. 16 attached thereto.
Figure 21:
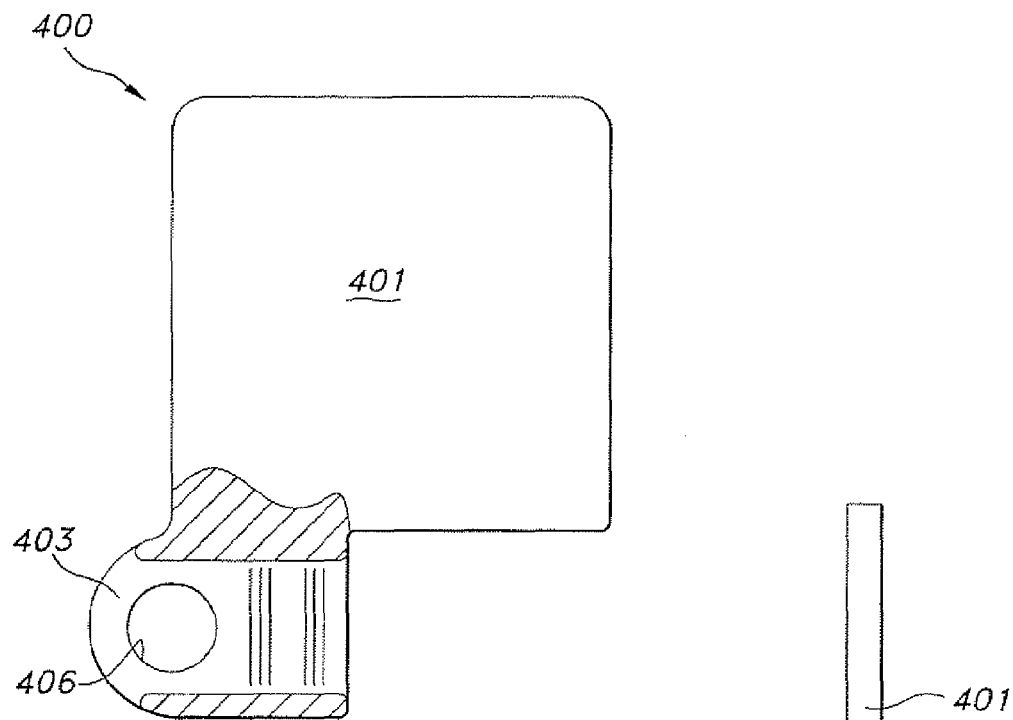
FIG. 21 is a side elevational view of a fifth embodiment of the lane divider of the present invention.

Turning to FIGS. 16-20, a fourth embodiment of the lane divider is shown. Lane divider 300 has a flight portion 302, an eyelet portion 303 and a hook portion 306. The eyelet portion 303 replaces one of the link ends and has a transverse opening 309 that receives a pivot rod (not shown) to connect the lane divider to the belt module 312 and to provide additional support for the lane divider 300. The eyelet portion 303 fits adjacent to a truncated link end 320 and hook portion 306 engages with transverse rib 310 of belt module 312 when the lane divider is installed as shown in FIG. 20. A retention member is formed between the outside surface of the eyelet portion 303 and the hook portion 306. In addition to the truncated link end 320, belt module 312 has conventional link ends 323, 325 extending in opposite directions. Link ends 323 include transverse openings 327. Link ends 325 include elongated transverse slots 329.

Figure 22:
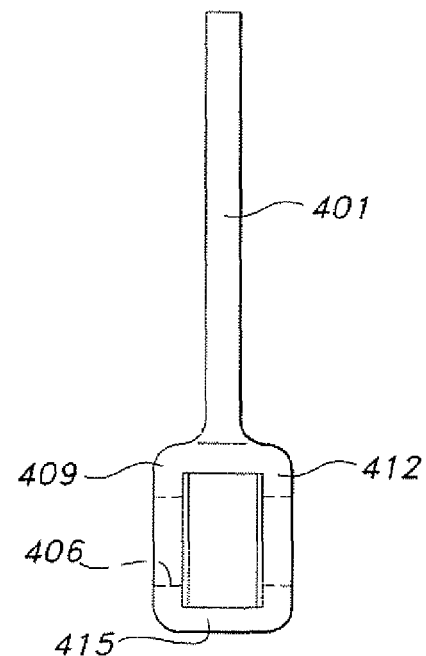
FIG. 22 is an end view of the lane divider of FIG. 21.

Turning to FIGS. 21-25, a fifth embodiment of the lane divider attachment is shown. The lane divider 400 has a flight portion 401 and an eyelet portion 403 with a transverse opening 406 for receiving a pivot rod (not shown). The eyelet portion 403 has a pair of side walls 409, 412 and a bottom wall 415 as shown in FIG. 22.

Figure 23:
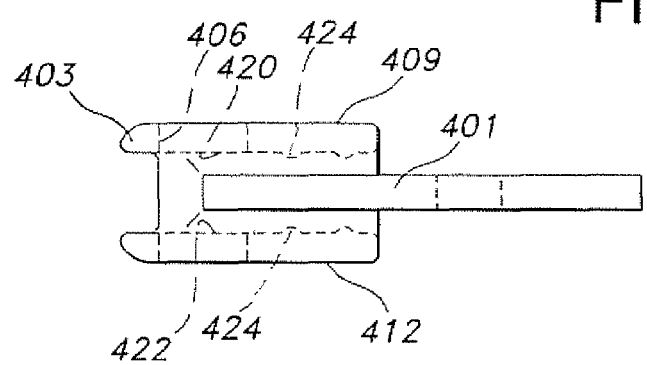
FIG. 23 is a top plan view of the lane divider of FIG. 21.
Figure 24:
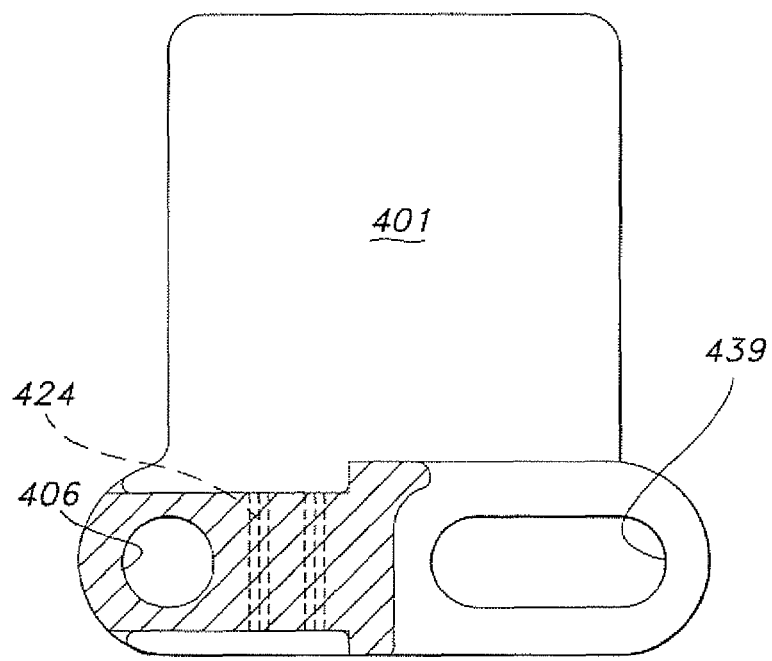
FIG. 24 is a cross-sectional view taken along lines 24-24 of FIG. 25.

As shown in FIG. 23, the side walls 409, 412 have inner walls 420, 422 with ribs 424 extending therefrom. The ribs 424 frictionally engage with the sides of the link end 416 to hold the lane divider attachment in position. The lane divider attachment is held in position by the combination of the ribs 424 on the inside of the side walls 409, 412 and by aligning the transverse opening 406 of the eyelet portion 403 with the transverse openings 435 on the conventional link ends 433 and inserting a pivot rod (not shown). As a result, the tubular configuration of the eyelet portion 403 itself provides the retention member and the hook portion is not required in this embodiment of the lane divider attachment.

Figure 25:
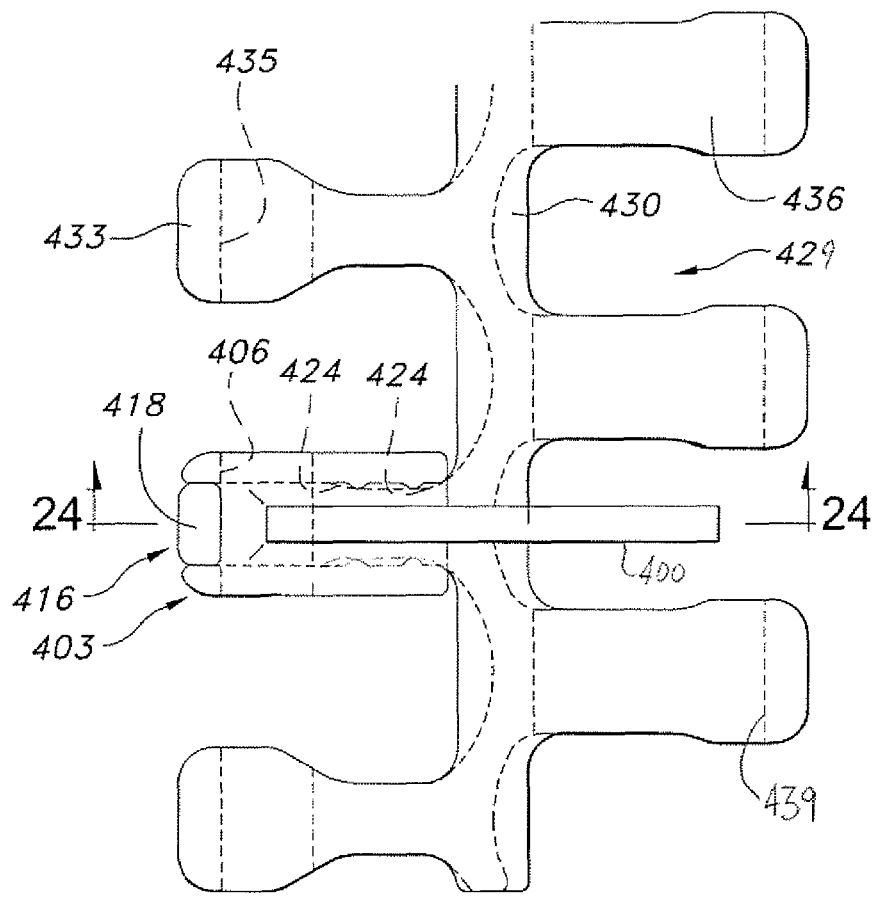
FIG. 25 is a top plan view of a portion of a belt module having the lane divider of FIG. 21 attached thereto.
Figure 28:
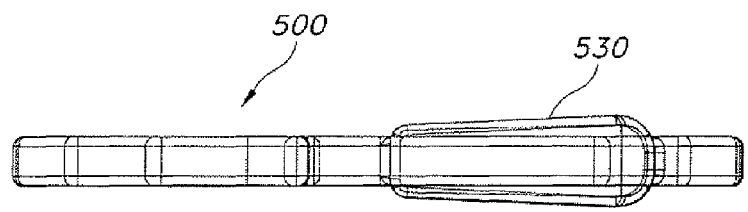
FIG. 28 is a top plan view of the lane divider of FIG. 26.

As shown in FIG. 25, the cross rib 430 extends transverse to a first plurality of link ends 433 and a second plurality of link ends 436. The first plurality of link ends 433 have a transverse opening 435. The second plurality of link ends 436 have a transverse elongated opening 439 to form a radius belt. Belt module 429 also includes a special link end 416 to which eyelet portion 403 engages. As a result, the eyelet portion 403 surrounds the link end 416 where it is attached (best seen in FIG. 24). The link end 416 is a special link end having a head portion 418 that is narrower than conventional link ends 433, 436. The narrower head portion 418 fits inside the eyelet portion 403 as shown in FIG. 25.

Figures 26, 27:
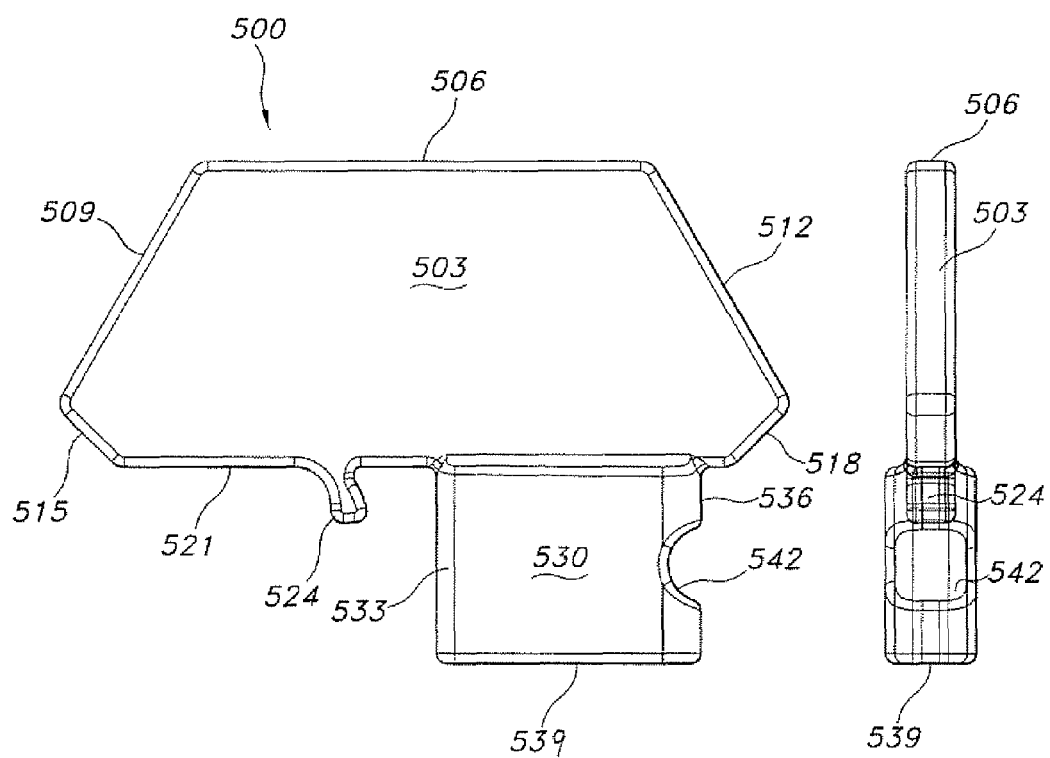
FIG. 26 is a side elevational view of a sixth embodiment of the lane divider of the present invention.
FIG. 27 is an end view of the lane divider of FIG. 26.
Figure 31:
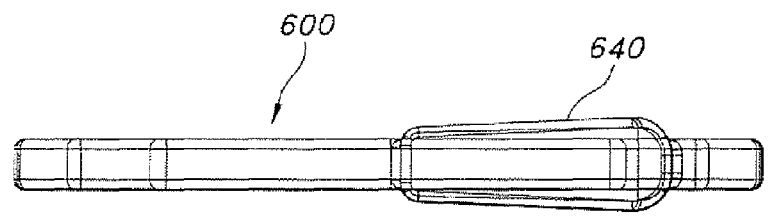
FIG. 31 is a top plan view of the lane divider of FIG. 29.
Figure 32:
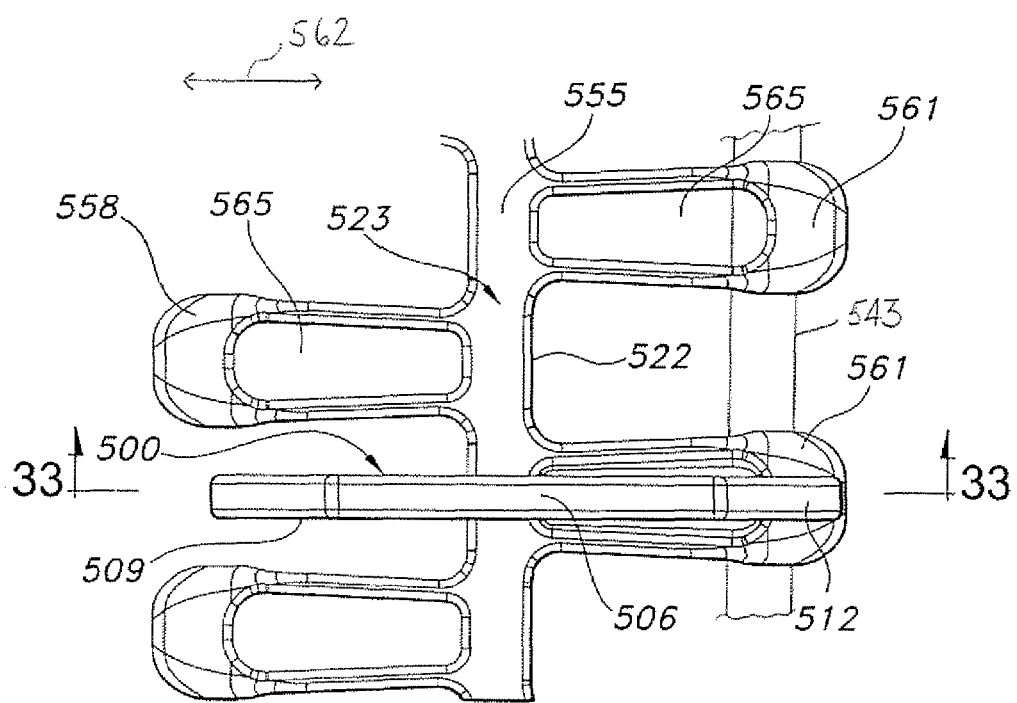
FIG. 32 is a top plan view of the lane divider of FIG. 26 installed in a flush grid belt module; and, FIG. 33 is a cross-sectional view taken along lines 33-33 of FIG. 32.

Turning to FIGS. 26-33, another alternate embodiment of the present invention is shown in connection with a large open area flush grid radius belt. In FIG. 26, a lane divider 500 has an upstanding wall 503. The wall 503 may be formed with a top wall 506 that extends substantially parallel to the conveying surface. The top wall 506 connects at opposite ends to angled side walls 509, 512. Additional angled walls 515, 518 extend to a bottom wall 521. The bottom wall 521 extends substantially parallel with the conveying surface 523 of the belt module 522 (FIG. 32).

Figure 33:
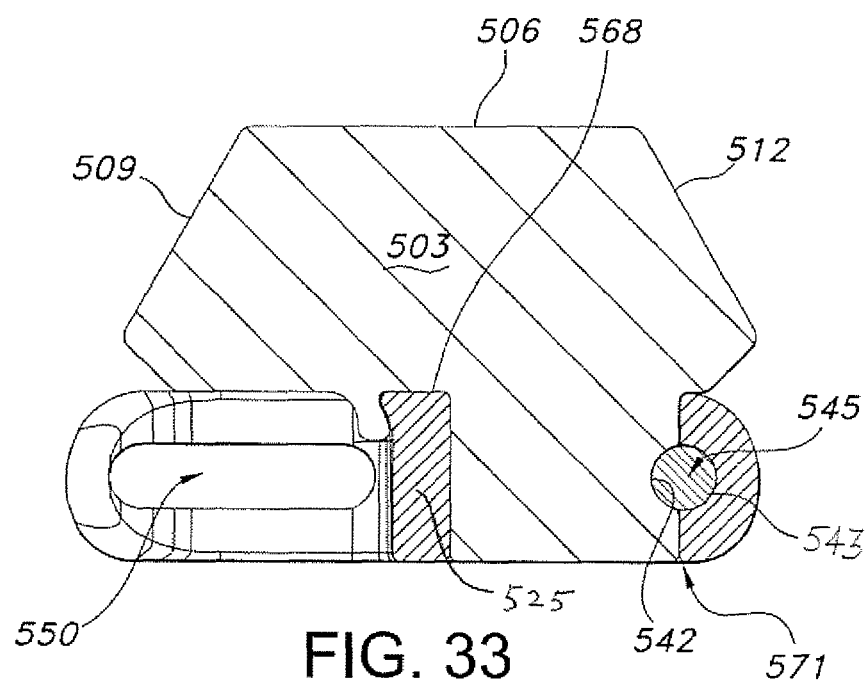

The bottom wall 521 may support a hook portion 524 extending downward therefrom and at an angle to the bottom wall 521. The hook portion 524 may be used to secure the lane divider 500 to the intermediate section or cross rib 525 of the module 522 as best shown in FIG. 33. A spacer member 530 may also extend downward from the bottom wall 521 with respect to the orientation of FIG. 26. The spacer member 530 has a pair of side walls 533, 536 and a bottom wall 539. The bottom wall 539 extends substantially parallel to the bottom wall 521. Side wall 536 includes a recess 542 that receives a portion of the pivot rod when the lane divider 500 is installed in the belt module 522 and held in position in part by the pivot rod 543 (in FIG. 32 the pivot rod is shown in position with the intercalated module removed for clarity). As best shown in FIG. 33, the recess 542 forms a part of a circular opening 545 that receives the pivot rod 543. On the other side of the module 522, there is an elongate transverse pivot rod opening 550. When the elongate transverse pivot rod openings 550 are intercalated with the circular openings 545, the result is a modular radius belt that is capable of negotiating turns in either direction.

Turning to FIG. 32, belt module 522 has an intermediate section 555 having a plurality of first link ends 558 extending in a first direction and a plurality of second link ends 561 extending in a second direction opposite the first direction. The direction of belt travel is indicated by arrow 562. The first and second plurality of link ends 558, 561 are offset in a direction transverse to the direction of belt travel. The first link ends 558 have an elongate transverse opening 550 shown in FIG. 33. The second link ends 561 have a round or circular transverse opening 545 shown in FIG. 33. When the link ends on adjacent modules 522 are intercalated and a pivot rod 543 is inserted through the aligned transverse openings a modular belt of selectable width is formed. Because of the elongate slots 550, the belt is capable of "fanning" out on either side such that the belt can run on a straight section or turn in either direction. Returning to FIG. 32, the link ends 558, 561 having openings 565 extending from the top surface 568 (FIG. 33) of the belt module 522 all the way through to the bottom surface 571 (FIG. 33).

Figures 29, 30:
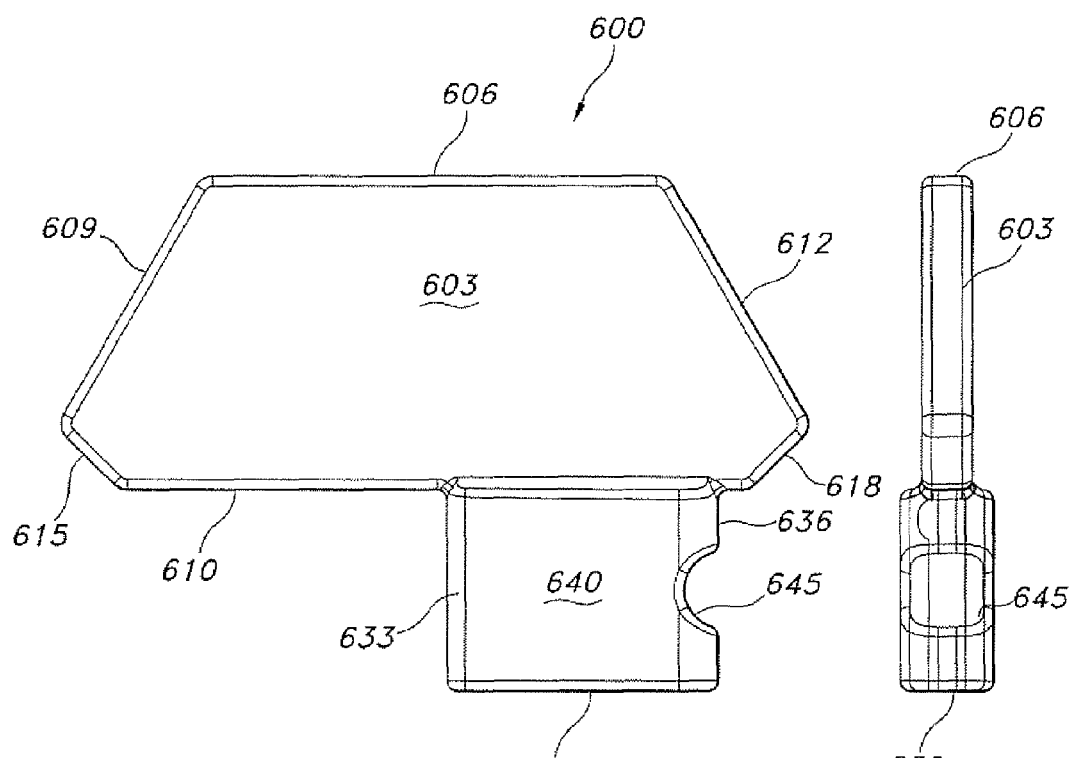
FIG. 29 is a side elevational view of a seventh embodiment of the lane divider of the present invention.
FIG. 30 is an end view of the lane divider of FIG. 29.

In FIGS. 29-31, an alternate embodiment of the lane divider 500 is shown. Lane divider 600 is substantially similar to lane divider 500 except the bottom wall 610 does not have a hook portion extending therefrom. A spacer portion 640 extends downward from the bottom wall 610. The flight portion 603 has a top wall 606 extending to a pair of angled walls 609 and 612. Additional walls 615 and 618 extend to a bottom wall 610. The spacer portion 640 extending from the bottom wall 610 may be formed with a pair of side walls 633 and 636 connected by a bottom wall 639. A recess 645 may be formed in the side wall 636. In use, the spacer portion 645 is inserted in a vertical opening such as opening 565 in FIG. 32. With the spacer portion 645 inserted through the opening 565, insertion of a pivot rod 543 through the aligned openings in adjacent link ends causes the pivot rod 543 to be disposed in the recess 645 which holds the lane divider 600 in position. With the lane divider 600 installed, the side walls of the spacer portion are disposed adjacent to the walls defining the opening 565.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A lane divider attachment for use with a belt module having link ends connected by a cross-rib, the lane divider attachment, comprising:
    an upstanding flight portion having a bottom surface;
    an eyelet portion disposed adjacent to the bottom surface, the eyelet portion having a transverse pivot rod opening defined therein; and
    a retention member disposed adjacent to the bottom surface and capable of engaging with the cross-rib of the belt module wherein the retention member further comprises a hook portion and an angled portion disposed in spaced apart facing relation.

2. A lane divider attachment for use with a belt module having link ends connected by a cross-rib, the lane divider attachment, comprising:
    an upstanding flight portion having a bottom surface;
    an eyelet portion disposed adjacent to the bottom surface, the eyelet portion having a transverse pivot rod opening defined therein; and
    a retention member disposed adjacent to the bottom surface and capable of engaging with the cross-rib of the belt module wherein the retention member comprises a hook portion disposed in spaced apart relation to an outside surface of the eyelet portion.

3. A belt module, comprising:
    a cross-rib;
    a first plurality of link ends extending in a first direction from the cross-rib, the first plurality of link ends having substantially round transverse openings defined therein;
    a second plurality of link ends extending in a second direction opposite the first direction, the second plurality of link ends having elongated transverse openings defined therein;
    at least one of the first and second link ends being truncated to form a wall disposed in spaced apart relation to the cross-rib; and
    a lane divider attachment capable of being attached to the cross-rib such that the lane divider is disposed adjacent to the wall of the truncated link end, the lane divider having an upstanding flight portion having a bottom surface, an eyelet portion with a transverse pivot rod opening and a retention member for engaging with the cross-rib.

4. The belt module of claim 3, wherein the retention member further comprises a hook portion and an angled portion disposed in spaced apart facing relation.

5. The belt module of claim 3, wherein the eyelet portion extends from the bottom surface.

6. The belt module of claim 3, wherein the eyelet portion has a thickness approximately equal to the thickness of the link end.

7. The belt module of claim 3, wherein the eyelet portion is thicker than the flight portion.

8. A lane divider attachment for use with a belt module having link ends connected by a cross-rib, the lane divider attachment, comprising:
    an upstanding flight portion having a bottom surface;
    a hook portion disposed adjacent to the bottom surface and capable of engaging with a portion of the cross-bar;
    at least two walls extending from the flight portion, the at least two walls disposed in spaced apart relation and having angled portions disposed in opposed facing relation to the hook portion; and
    wherein the at least two walls engage with a truncated link end.

9. The lane divider attachment of claim 8, wherein the at least two walls include a curved portion sized to mate with a transition section on the belt module where at least one of the link ends connects to the cross bar.

10. A lane divider attachment for use with a belt module having a cross-rib connecting a plurality of link ends, the lane divider attachment, comprising:
    an upstanding flight portion having a bottom surface; and
    an eyelet portion disposed adjacent to the bottom surface, the eyelet portion being tubular with a pair of aligned transverse pivot rod openings in opposed sidewalls, the eyelet portion capable of receiving one of the link ends such that the transverse pivot rod openings in the link end align with the transverse pivot rod openings in the eyelet portion.

11. The lane divider attachment of claim 10, wherein an inside wall of the eyelet portion has a rib for engaging with one of the link ends.

12. A belt module, comprising:
    an intermediate section;
    a first plurality of link ends extending in a first direction from the intermediate section, the first link ends having a top surface and a bottom surface, the first link ends having an opening extending from the top to the bottom surface;
    a second plurality of link ends extending in a second direction opposite the first direction; the second link ends having a top surface and a bottom surface, the second link ends having an opening extending from the top to the bottom surface;
    a lane divider having an upstanding flight and having a spacer portion capable of extending through one of the openings in the first and second plurality of link ends, the spacer portion having a recess defined therein for receiving at least a portion of a pivot rod, the lane divider being held in position in the module by the pivot rod when the pivot rod is inserted through the recess.

13. The belt module of claim 12, further comprising a hook portion extending from the bottom wall of the upstanding flight, the hook portion capable of engaging with the intermediate section.

14. The belt module of claim 12, wherein one of the first and second plurality of link ends has an elongated transverse opening.

15. The belt module of claim 12, wherein one of the first and second plurality of link ends has a round transverse opening.

16. The belt module of claim 12, wherein the recess formed in the spacer portion has a semicircular shape.

* * * * *